United States Patent
Lin et al.

(10) Patent No.: US 8,205,038 B2
(45) Date of Patent: Jun. 19, 2012

(54) FLASH MEMORY ACCESSING APPARATUS AND ACCESSING METHOD THEREOF

(75) Inventors: Hou-Yuan Lin, Taipei Hsien (TW); Chen-Shun Chen, Taipei Hsien (TW)

(73) Assignee: Giga-Byte Technology Co., Ltd., Taipei Hsien (TW)

( * ) Notice: Subject to any disclaimer, the term of this patent is extended or adjusted under 35 U.S.C. 154(b) by 352 days.

(21) Appl. No.: 12/578,599

(22) Filed: Oct. 14, 2009

(65) Prior Publication Data
US 2011/0087826 A1   Apr. 14, 2011

(51) Int. Cl.
*G11C 11/34* (2006.01)
(52) U.S. Cl. ........... 711/103; 365/185.33; 711/E12.001; 711/E12.008
(58) Field of Classification Search ........... 711/103, 711/E12.001, E12.008; 365/185.33
See application file for complete search history.

(56) References Cited

U.S. PATENT DOCUMENTS

| | | | |
|---|---|---|---|
| 7,688,628 B2 * | 3/2010 | Grimsrud | 365/185.11 |
| 7,886,212 B2 * | 2/2011 | Lasser | 714/763 |
| 2008/0205141 A1 * | 8/2008 | Lee et al. | 365/185.03 |
| 2011/0087824 A1 * | 4/2011 | Lin et al. | 711/103 |
| 2011/0087826 A1 * | 4/2011 | Lin et al. | 711/103 |

\* cited by examiner

*Primary Examiner* — Kevin Ellis
*Assistant Examiner* — Mehdi Namazi
(74) *Attorney, Agent, or Firm* — Chun-Ming Shih

(57) ABSTRACT

A flash memory accessing apparatus is disclosed. The flash memory accessing apparatus includes a memory controller, a first open NAND flash interface (ONFI) and an expanding flash memory module. The first ONFI is used for connecting a main flash memory module. The memory controller obtains a detecting result by, detecting whether the main flash memory module and the expanding flash memory module are single side or double side. The memory controller further configures an accessing method of the main flash memory module and the expanding flash memory module according to the detecting result.

16 Claims, 4 Drawing Sheets

FLASH MEMORY ACCESSING APPARATUS AND ACCESSING METHOD THEREOF

BACKGROUND OF THE INVENTION

1. Field of the Invention

The present invention relates to a flash memory accessing apparatus and an accessing method thereof. More particularly, the present invention relates to an accessing apparatus for expanding an open NAND flash interface, and an accessing method thereof.

2. Description of Related Art

In the past, NAND flash memories are manufactured by many suppliers. Though the NAND flash memories manufactured by different suppliers may have similar packages, input/output pins and similar control command sets, each time when the NAND flash memories manufactured by different suppliers are replaced, firmware adjustments are necessary.

Accordingly, some major suppliers jointly put forward a so-called open NAND flash interface (which is referred to as ONFI hereinafter) standard for providing a standard specification and interface for the NAND flash memory. However, according to the ONFI standard, a controller of the flash memory only provides one set of ONFI signal line. Therefore, if two sets of flash memories are used, the ONFI signal line of the controller of the flash memory has to be dissembled into two sets for utilization, which may cause a great limitation in utilization.

SUMMARY OF THE INVENTION

The present invention is directed to a flash memory accessing apparatus and an accessing method thereof, which are used for expanding a flash memory on an open NAND flash interface (ONFI).

The present invention provides a flash memory accessing apparatus including a memory controller, a first ONFI and an expanding flash memory module. The first ONFI is coupled to the memory controller, and is used for connecting a main flash memory module. The expanding flash memory module is coupled to the memory controller and the first ONFI. Wherein, the memory controller obtains a detecting result by detecting whether the main flash memory module connected to the first ONFI and the expanding flash memory module are single side or double side. The memory controller further configures an accessing method of the main flash memory module and the expanding flash memory module according to the detecting result.

In an embodiment of the present invention, when the memory controller detects that the main flash memory module and the expanding flash memory module are all single side, the memory controller connects the main flash memory module and the expanding flash memory module to form a dual channel flash memory module.

In an embodiment of the present invention, when the memory controller detects that the main flash memory module and the expanding flash memory module are all double side, the memory controller configures one of the main flash memory module and the expanding flash memory module as a working memory, and configures another one of the main flash memory module and the expanding flash memory module as a spare memory.

In an embodiment of the present invention, the memory controller further disables the spare memory.

In an embodiment of the present invention, the memory controller further detects whether a read or a write operation of the working memory is normal.

In an embodiment of the present invention, when the memory controller detects that the read or the write operation of the working memory is abnormal, the memory controller disables the working memory, and switches the spare memory to serve as the working memory.

In an embodiment of the present invention, the memory controller, the first ONFI and an expanding flash memory interface are all disposed on a motherboard.

In an embodiment of the present invention, the flash memory accessing apparatus further includes an expanding flash memory interface. The expanding flash memory interface is coupled to the memory controller and the first ONFI, and is used for connecting the expanding flash memory module.

In an embodiment of the present invention, the memory controller, the first ONFI and the expanding flash memory interface are disposed on a motherboard, and the expanding flash memory interface is a second ONFI.

In an embodiment of the present invention, the expanding flash memory module is directly disposed on a motherboard, and the memory controller and the first ONFI are disposed on the motherboard.

The present invention provides a flash memory accessing method. First, a first ONFI is provided to connect a main flash memory module, and an expanding flash memory module is provided. Next, whether the main flash memory module connected to the first ONFI and the expanding flash memory module are single side or double side is detected to obtain a detecting result. Next, an accessing method of the main flash memory module and the expanding flash memory module is configured according to the detecting result.

In the present invention, besides the ONFI, the expanding flash memory interface is further provided to expand a capacity of the flash memory, and by detecting a single/double side state of the main flash memory module on the ONFI and the expanding flash memory module on the expanding flash memory interface, the accessing method of the main flash memory module and the expanding flash memory module is configured. Therefore, application of the expanding flash memory module and the main flash memory module is effectively optimized.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
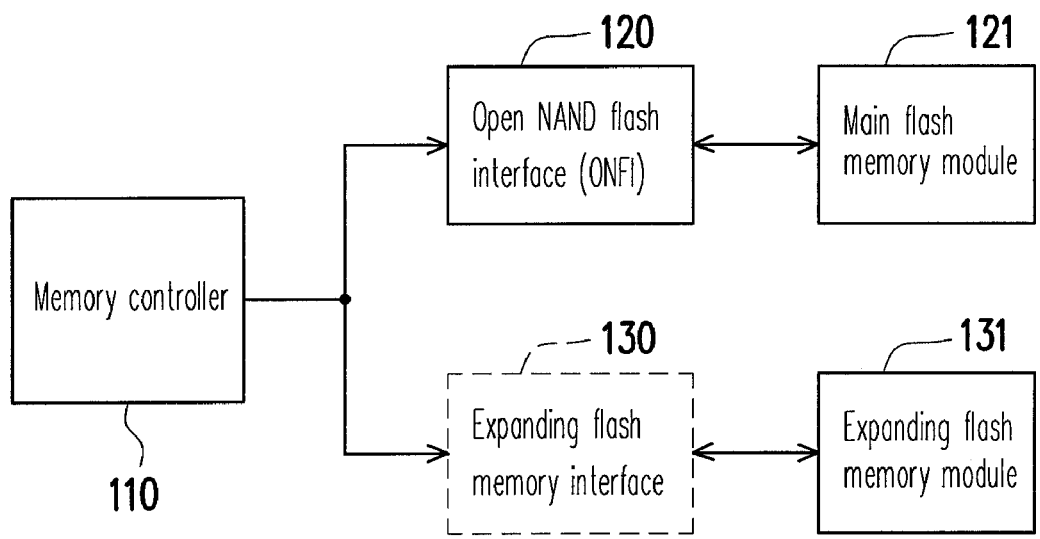
FIG. 1A is a schematic diagram illustrating a flash memory accessing apparatus 100 according to an embodiment of the present invention.

Referring to FIG. 1A, FIG. 1A is a schematic diagram illustrating a flash memory accessing apparatus 100 according to an embodiment of the present invention. The flash memory accessing apparatus 100 includes a memory controller 110, an open NAND flash interface (ONFI) 120 and an expanding flash memory interface 130. The ONFI 120 is coupled to the memory controller 110, and is used for connecting a main flash memory module 121. The expanding flash memory interface 130 is also coupled to the memory controller 110, and is used for connecting an expanding flash memory module 131.

After the main flash memory module 121 is connected to the ONFI 120 and the expanding flash memory module 131 is connected to the expanding flash memory interface 130, the memory controller 110 detects whether the main flash memory module 121 and the expanding flash memory module 131 respectively connected to the ONFI 120 and the expanding flash memory interface 130 are single side memory modules or double side memory modules to obtain a detecting result.

When the detecting result obtained by the memory controller 110 indicates that the main flash memory module 121 and the expanding flash memory module 131 are all the single side memory modules, it represent that a control signal line provided by the memory controller 110 is enough to simultaneously access the main flash memory module 121 and the expanding flash memory module 131. Therefore, the memory controller 110 connects the main flash memory module 121 and the expanding flash memory module 131 to form a so-called dual channel flash memory module. In case of the dual channel flash memory module, the memory controller 110 divides data to be stored into two parts, and simultaneously stores the divided two parts into the main flash memory module 121 and the expanding flash memory module 131, respectively, which can effectively increase a data storing speed. Comparatively, when data is read, two parts of data can be simultaneously read from the main flash memory module 121 and the expanding flash memory module 131, and the memory controller 110 combines the two parts of data to obtain an original stored data. Similarly, a data reading speed is increased.

Moreover, when the detecting result obtained by the memory controller 110 indicates that the main flash memory module 121 and the expanding flash memory module 131 are all the double side memory modules, the memory controller 110 configures one of the main flash memory module 121 and the expanding flash memory module 131 as a working memory, and configures another one of the main flash memory module 121 and the expanding flash memory module 131 as a spare memory. Namely, when the main flash memory module 121 and the expanding flash memory module 131 are all the double side memory modules, only one of the memories can be accessed (the one configured as the working memory), and the other one of the memories is configured as the spare memory and cannot be accessed.

For example, when the detecting result obtained by the memory controller 110 indicates that the main flash memory module 121 and the expanding flash memory module 131 are all the double side memory modules, the memory controller 110 configures the main flash memory module 121 as the working memory for accessing, and configures the expanding flash memory module 131 as the spare memory, and disables the spare memory (the expanding flash memory module 131).

Moreover, the memory controller 110 further performs a read/write test on the flash memory module used as the working memory, so as to detect whether the flash memory module used as the working memory is damaged. When the read/write test performed on the flash memory module used as the working memory (for example, the main flash memory module 121) cannot be normally executed, it represents that the main flash memory module 121 is damaged. Then, the memory controller 110 switches the expanding flash memory module 131 originally used as the spare memory to the working memory, and disables the main flash memory module 121 originally used as the working memory.

The memory controller 110 can perform the read/write test to the working memory according to a fixed time period. Namely, the memory controller 110 performs the read/write test on the working memory to detect whether the flash memory module used as the working memory is damaged every the fixed time period.

On the other hand, the memory controller 110 can further configure the expanding flash memory module 131 to serve as a spare memory of the main flash memory module 121. Namely, besides storing data to the main flash memory module 121, the data can also be stored in the expanding flash memory module 131 as a backup. A method to backup the data in the main flash memory module 121 is that the memory controller 110 copies the data in the main flash memory module 121 to the expanding flash memory module 131 every a fixed time period. Calculation of the fixed time period can be implemented by hardware or software. Moreover, the flash memory accessing apparatus 100 can provide a software interface for a user to set or change the fixed time period.

It should be noticed that the memory controller 110, the ONFI 120 and the expanding flash memory interface 130 can be simultaneously disposed on a same circuit substrate (for example, a motherboard). Alternatively, the expanding flash memory interface 130 is not used, and the expanding flash memory module 131 is directly disposed on the motherboard.

Figure 1B:
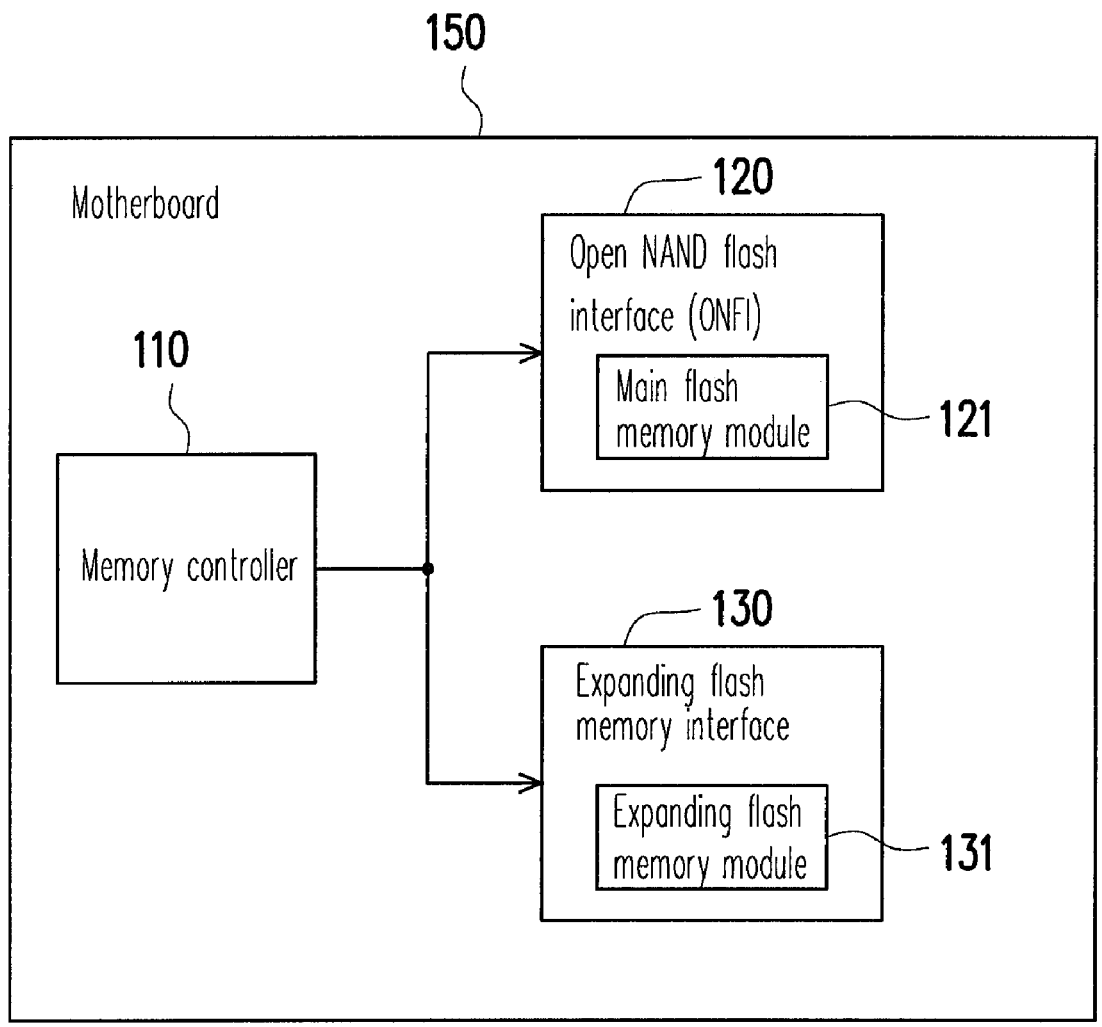
FIG. 1B and FIG. 1C are schematic diagrams illustrating different approaches of configuring a flash memory accessing apparatus 100 on a motherboard according to an embodiment of the present invention.
Figure 1C:
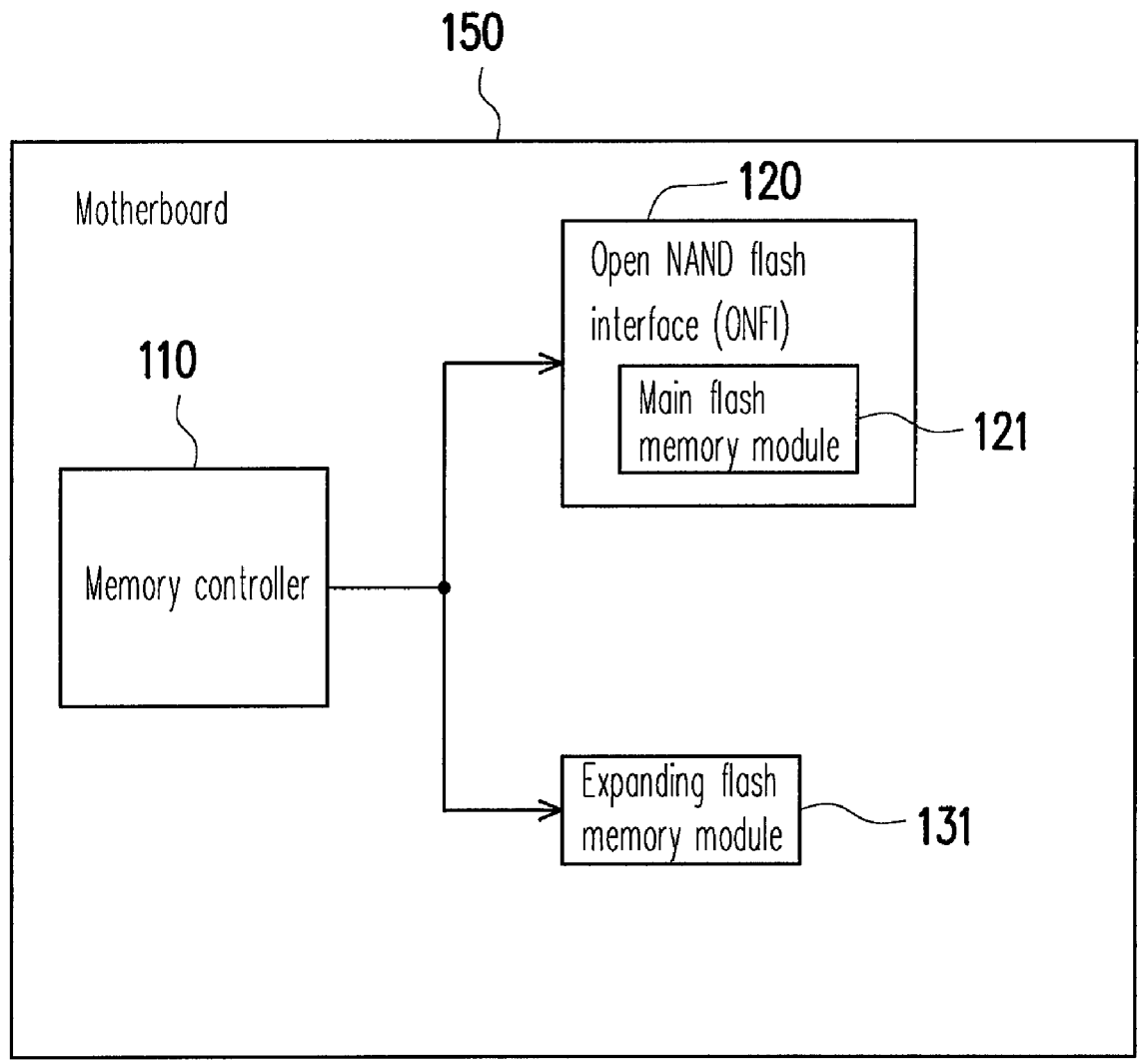

Referring to FIG. 1B and FIG. 1C for methods of disposing the flash memory accessing apparatus 100 on the motherboard. In FIG. 1B, the memory controller 110, the ONFI 120 and the expanding flash memory interface 130 are all disposed on the motherboard 150. The main flash memory module 121 is connected to the motherboard 150 through the ONFI 120, and the expanding flash memory module 131 is connected to the motherboard 150 through the expanding flash memory interface 130.

Moreover, in FIG. 1C, the memory controller 110 and the ONFI 120 are disposed on the motherboard 150, while the expanding flash memory interface 130 shown in FIG. 1B is not disposed on the motherboard 150. Comparatively, the expanding flash memory module 131 is directly disposed on the motherboard 150, which forms a so-called onboard flash memory module.

Figure 2:
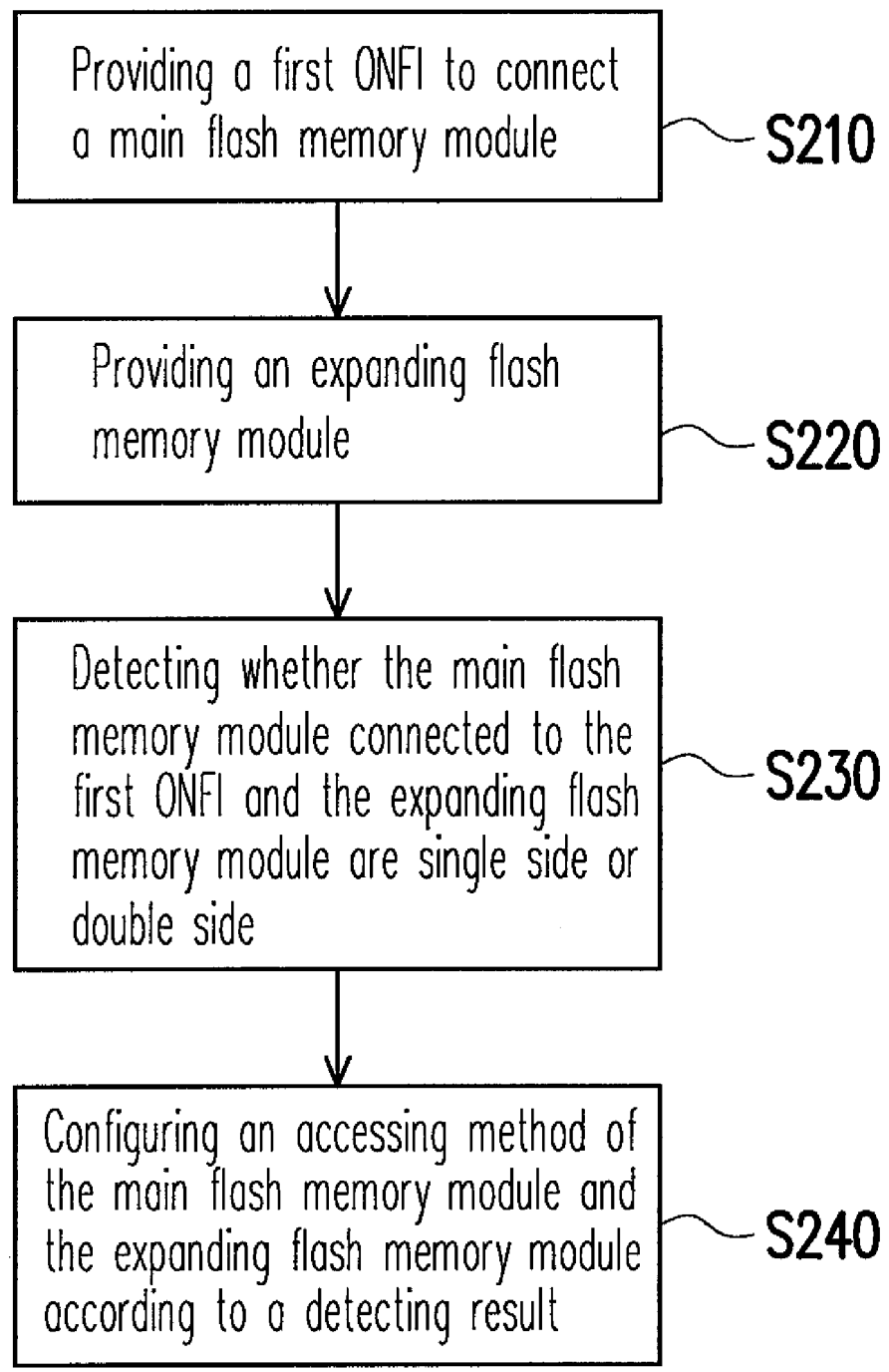
FIG. 2 is a flowchart illustrating a flash memory accessing method according to an embodiment of the present invention.

Referring to FIG. 2, FIG. 2 is a flowchart illustrating a flash memory accessing method according to an embodiment of the present invention. The method includes following steps. First, a first ONFI is provided to connect a main flash memory module (step S210), and an expanding flash memory module is provided (S220). Next, after the main flash memory module and the expanding flash memory module are connected, it is detected whether the main flash memory module connected to the first ONFI and the expanding flash memory module are single side or double side, so as to obtain a detecting result (S230). Next, an accessing method of the main flash memory module and the expanding flash memory module is configured according to the detecting result (S240).

It should be noticed that obtaining of the detecting result and configuration of the accessing method of the main flash memory module and the expanding flash memory module can all be implemented by a memory controller. Implementation of the memory controller is the same to the above described memory controller 110 in the flash memory accessing apparatus 100, and therefore detailed descriptions thereof are not repeated.

In summary, in the present invention, the accessing method of the main flash memory module and the expanding flash memory module can be configured by detecting whether the main flash memory module and the expanding flash memory module are single side or double side. Therefore, a memory volume of the ONFI is effectively expanded, and the main flash memory module and the expanding flash memory module can be efficiently used, so that an accessing bandwidth can be increased, and backup of stored data is achieved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A flash memory accessing apparatus, comprising:
    a memory controller;
    a first open NAND flash interface (ONFI), coupled to the memory controller for connecting a main flash memory module; and
    an expanding flash memory module, coupled to the memory controller and the first ONFI,
    wherein the memory controller obtains a detecting result by detecting whether the main flash memory module connected to the first ONFI and the expanding flash memory module are single side or double side, and configures an accessing method of the main flash memory module and the expanding flash memory module according to the detecting result.

2. The flash memory accessing apparatus as claimed in claim 1, wherein when the memory controller detects that the main flash memory module and the expanding flash memory module are all single side, the memory controller connects the main flash memory module and the expanding flash memory module to form a dual channel flash memory module.

3. The flash memory accessing apparatus as claimed in claim 1, wherein when the memory controller detects that the main flash memory module and the expanding flash memory module are all double side, the memory controller configures one of the main flash memory module and the expanding flash memory module as a working memory, and configures another one of the main flash memory module and the expanding flash memory module as a spare memory.

4. The flash memory accessing apparatus as claimed in claim 3, wherein the memory controller further disables the spare memory.

5. The flash memory accessing apparatus as claimed in claim 3, wherein the memory controller further detects whether a read or a write operation of the working memory is normal.

6. The flash memory accessing apparatus as claimed in claim 3, wherein when the memory controller detects that the read or the write operation of the working memory is abnormal, the memory controller disables the working memory, and switches to the spare memory to serve as the working memory.

7. The flash memory accessing apparatus as claimed in claim 1, further comprising:
    an expanding flash memory interface, coupled to the memory controller and the first ONFI for connecting the expanding flash memory module.

8. The flash memory accessing apparatus as claimed in claim 7, wherein the memory controller, the first ONFI and the expanding flash memory interface are disposed on a motherboard, and the expanding flash memory interface is a second ONFI.

9. The flash memory accessing apparatus as claimed in claim 1, wherein the expanding flash memory module is directly disposed on a motherboard, and the memory controller and the first ONFI are disposed on the motherboard.

10. A flash memory accessing method, comprising:
    providing a first open NAND flash interface (ONFI) to connect a main flash memory module;
    providing an expanding flash memory module;
    providing a memory controller for detecting whether the main flash memory module connected to the first ONFI and the expanding flash memory module are single side or double side to obtain a detecting result; and
    providing a memory controller for configuring an accessing method of the main flash memory module and the expanding flash memory module according to the detecting result.

11. The flash memory accessing method as claimed in claim 10, wherein the detecting result comprises:
    the main flash memory module and the expanding flash memory module are all single side or the main flash memory module and the expanding flash memory module are all double side.

12. The flash memory accessing method as claimed in claim 11, wherein the step of configuring the accessing method of the main flash memory module and the expanding flash memory module according to the detecting result comprises:
    when the detecting result is that the main flash memory module and the expanding flash memory module are all single side, a memory controller connects the main flash memory module and the expanding flash memory module to form a dual channel flash memory module.

13. The flash memory accessing method as claimed in claim 12, wherein the step of configuring the accessing method of the main flash memory module and the expanding flash memory module according to the detecting result further comprises:
    when the detecting result is that the main flash memory module and the expanding flash memory module are all double side, the memory controller configures one of the main flash memory module and the expanding flash memory module as a working memory, and configures another one of the main flash memory module and the expanding flash memory module as a spare memory.

14. The flash memory accessing method as claimed in claim 13, further comprising:
    providing a memory controller for detecting whether a read or a write operation of the working memory is normal.

15. The flash memory accessing method as claimed in claim 14, further comprising:
    providing a memory controller for disabling the working memory, and switching to the spare memory to serve as the working memory by the memory controller when the memory controller detects that the read or the write operation of the working memory is abnormal.

16. The flash memory accessing method as claimed in claim 10, further comprising:
    providing an expanding flash memory interface to connect the expanding flash memory module.

* * * * *